May 30, 1950 D. E. SUNSTEIN 2,509,374

ELECTROMAGNETIC WAVE AMPLIFIER

Filed June 7, 1946

INVENTOR.
DAVID E. SUNSTEIN

BY

William E. Denk

AGENT

Patented May 30, 1950 2,509,374

UNITED STATES PATENT OFFICE 2,509,374

ELECTROMAGNETIC WAVE AMPLIFIER

David E. Sunstein, Cynwyd, Pa., assignor to Philco Corporation, Philadelphia, Pa., a corporation of Pennsylvania Application June 7, 1946, Serial No. 674,970

2 Claims. (Cl. 315—39)

This invention relates to improvements in the amplification of electromagnetic waves. The invention has particular utility in microwave transmission systems.

More specifically, the invention relates to improved means which, in the preferred application, comprises a novel velocity-modulated tube adapted to amplify simultaneously two separate ultra-high-frequency electromagnetic signal waves without interference therebetween. Accordingly, my improved means functions both as a wave selector and as an amplifier.

The invention is particularly useful in the simultaneous amplification of two guided U.-H.-F. signal waves travelling in opposite directions. The amplification of the two waves may take place either simultaneously, or at partially overlapping times, or at non-overlapping times.

In the preferred embodiment, amplification of each of two different signal waves takes place, either simultaneously or otherwise, within a velocity-modulated tube, and each wave is propagated therefrom without interference from the other.

It is an object of this invention to provide means, comprising a novel unidirectional device, adapted to amplify simultaneously two ultra-high-frequency signal waves travelling in opposite directions without interference therebetween.

It is another object of this invention to provide two-directional amplification in a two-way ultra-high-frequency guided transmission system by means which comprise a novel velocity-modulated tube.

It is a further object of this invention to provide means, including a novel velocity-modulated tube, adapted to provide simultaneous amplification of a plurality of ultra-high-frequency signal waves without interference therebetween.

It is a feature of this invention that the velocity-modulated tube, used in the preferred embodiment to provide simultaneous amplification of the two different incoming signal waves, is equipped with buncher and catcher grids and with a cathode capable of emitting a wide sheetlike stream of electrons, that one incoming signal wave is coupled to one end of the buncher grids and the other incoming wave is coupled to the opposite end of the buncher grids, that the output coupling means for one signal wave is connected to one end of the catcher grids and the output coupling means for the other wave is connected to the opposite end of the catcher grids, and that the said input and output coupling means for the same signal wave are connected to opposite ends of the buncher and catcher grids respectively.

Figure 2:
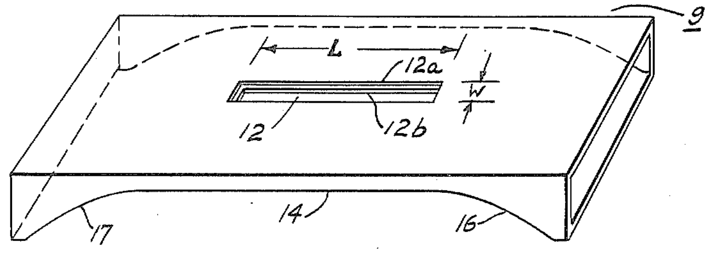
Figures 1, 3:
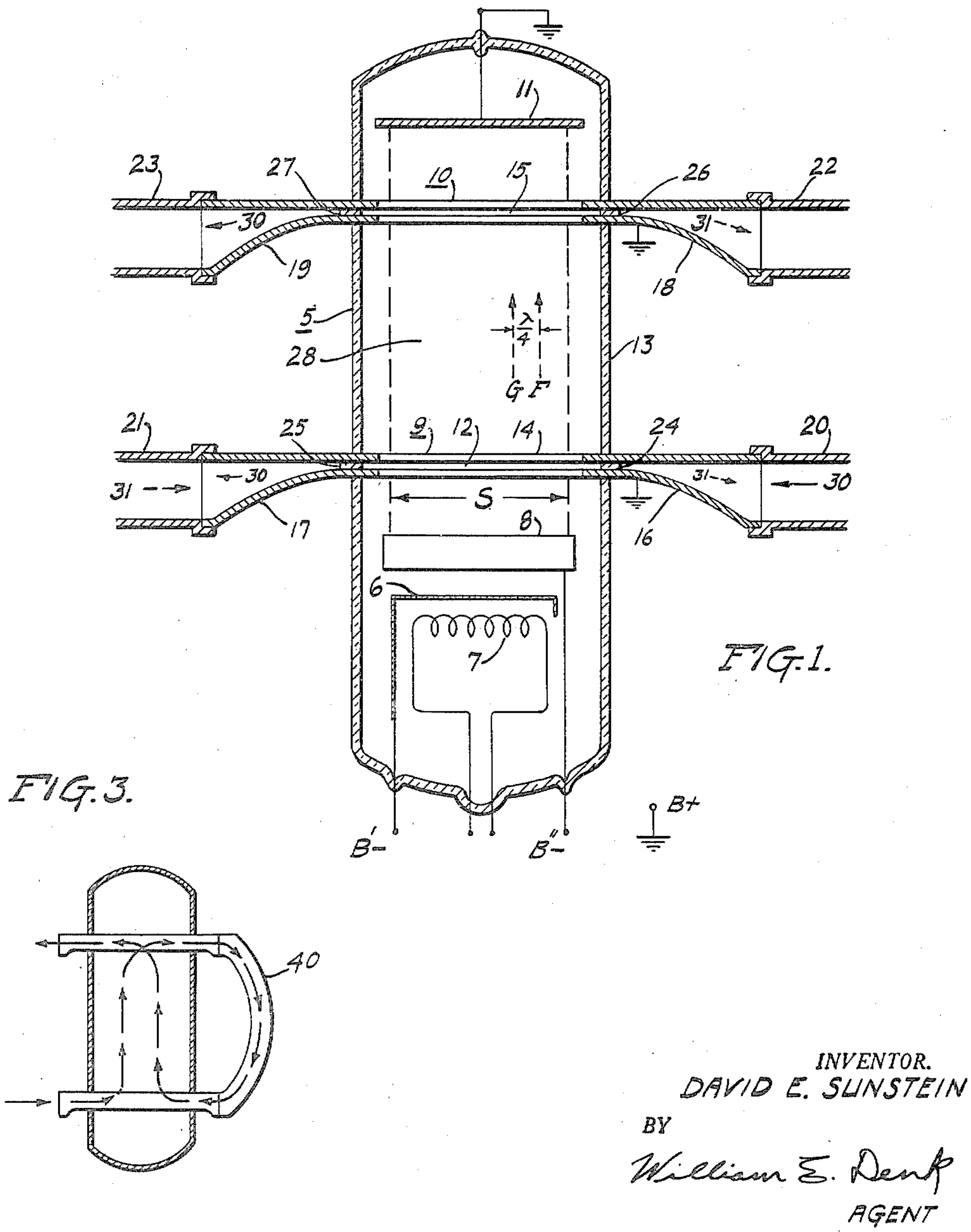

These and other objects, features and advantages of the present invention will be best understood from a consideration of the following description and accompanying drawings in which Figure 1 is an illustration, in section, of a novel velocity-modulated tube structure embodying a preferred form of the invention;

Figure 2 is an isometric view of one form of buncher or catcher wave guide which is preferably an integral part of the novel velocity-modulated tube structure; and Figure 3 is a representation of a particular application of my novel tube.

Referring now to Figure 1, there is illustrated in section a velocity-modulated vacuum tube 5 embodying my invention and comprising a cathode 6, heater 7, focusing electrodes 8, a buncher wave guide 9, a catcher wave guide 10, and a collector plate 11.

The novel structure and functioning of my improved tube will become clear from the description which follows. In respects other than as described in detail, the tube structure and its operation is conventional and in accordance with known velocity-modulated tube principles. For example, in accordance with customary practice, cathode 6 is maintained at negative D.-C. potential by a suitable source of power (not shown). Buncher guide 9, catcher guide 10 and collector plate 11 are at positive D.-C. potential with respect to the cathode, and are ordinarily grounded. The D.-C. potential difference between cathode 6 and the buncher and catcher guides 9—10 is adequate to provide the necessary velocity to the electrons emitted by the cathode, so that the time required for the electrons to move from the buncher to the catcher guides is proper for maximum energy transfer between the electron stream and the catcher field, as will be understood by those skilled in the art. Focusing electrodes 8 are held at a D.-C. potential slightly positive with respect to cathode 6.

The cathode 6, in combination with focusing electrodes 8, is constructed and arranged to emit electrons in a wide sheetlike stream S, indicated by the dotted lines in Figure 1. In accordance with my invention, the width of the stream is equal to one or more, preferably five, times the wavelength of the lowest frequency which the apparatus is capable of handling on a dual-amplification basis. The width of the electron stream may desirably approach as nearly as possible the width of the tube envelope itself.

Buncher wave guide 9 and catcher wave guide 10 are equipped with slots which constitute the necessary buncher and catcher grids. These grids are shown in Figure 2. In discussing Figure 2, it will be assumed that the illustration is that of buncher wave guide 9, and the same reference numerals are used in Figure 2 as are used in Figure 1 for the buncher wave guide and its associated parts. It should be understood, however, that catcher wave guide 10 and its associated parts may be similar in structure. Consequently, Figure 2 may be deemed illustrative of catcher wave guide 10 as well as of buncher wave guide 9.

Referring now to Figure 2, wave guide 9 is shown to have a pair of rectangular openings 12*a* and 12*b*, one being in the top and the other in the bottom surface of the wave guide. These openings are in line with each other and also with the stream of electrons emitted by cathode 6. The openings constitute a pair of buncher grids and together form a slot 12 through wave guide 9.

Instead of being completely open rectangles, the grids 12*a* and 12*b* may be grate-like in structure. Or each grid may, if desired, be formed by a group of spaced circular perforations of the same or different sizes.

In Figure 2, the length L of the buncher slot 12 is substantially equal to the width of the sheetlike electron stream. The slot length L is also substantially equal to the length of the narrow or constricted portion 14 of wave guide 9. This narrow portion of wave guide 9 is located between the walls 13 of the velocity-modulated tube, as is shown in Figure 1.

The width W of the buncher slot 12 is adequate to pass the sheetlike stream of electrons and may, for example, be of the order of one-tenth of the total physical width of wave guide 9. The width of wave guide 9 may or may not coincide with the width of the envelope of velocity-modulated tube 5; frequently the wave guide will be wider. Normally slot 12 will be centrally located with respect to the longitudinal edges of wave guide 9.

Wave guide 9 spreads or flares in both directions from its narrow or constricted portion 14 as is shown in the drawings; the flared sections are identified as 16 and 17.

As indicated previously, catcher wave guide 10 is constructed similarly to buncher wave guide 9; it has a similar pair of grid openings which together form a catcher slot 15, and it has similar flared sections identified in Figure 1 as 18 and 19.

As will be seen in Figure 1, the flared sections of wave guides 9 and 10 are located outside the walls 13 of the main envelope of the velocity-modulated tube but these sections are preferably integral parts of the structure of the velocity-modulated tube 5. Flared sections 16, 17, 18 and 19 function as impedance matching sections and the physical length of each is preferably many wave lengths at the lowest operating signal frequency. The outer end of each section is adapted to be coupled, either directly or through additional impedance matching sections, to the main transmission line wave guides or coaxial lines, identified in Figure 1 by the reference numerals 20, 21, 22 and 23.

Wall 13 of the envelope of tube 5 will ordinarily be of glass but may, of course, be of any suitable material. The portions 24, 25, 26 and 27 of the wall which are inside the buncher and catcher wave guides are preferably of the order of one-half wavelength thick in order to avoid or reduce reflections.

It will be apparent to those skilled in the velocity modulation tube arts that the collector plate 11 may be omitted, if desired, the upper surface of guide 10 being employed as a collector element. In such an arrangement, of course, the upper surface of guide 10 is preferably imperforate.

The operation of the device will now be described. Assume a signal wave to be travelling through main wave guide 20 in the direction shown by the solid arrow 30, that is, from right to left. This wave passes through buncher wave guide 9 (comprised of impedance matching section 16, constricted section 14, and impedance matching section 17) and enters main wave guide 21 considerably attenuated. Most of the attenuation occurs in constricted section 14.

Consider now the wide sheetlike stream of electrons which is being emitted by cathode 6, all of the electrons travelling towards bunching slot 12 at substantially the same speed. Electrons belonging to the same line or file (as distinguished from the same row) enter the buncher slot 12 later or earlier than others of that file, and hence encounter different conditions of field potential dependent upon the instantaneous potential of the main signal wave. In the drift portion 28 of the tube, the electrons of the same file are therefore bunched together in accordance with conventional principles concerning velocity-modulated tubes. While the change, if any, in the velocity of each electron is dependent upon well known principles, the velocity-modulated tube of the present invention differs from the conventional tube in the manner about to be described.

In the conventional velocity-modulated tube the electron beam emitted by the cathode is only a fraction of a wavelength wide and the changes in electron velocity which take place are between electrons of substantially the same file. In the tube of the present invention the stream is a plurality of wavelengths wide, preferably at least five wavelengths with respect to the lowest signal frequency to be amplified. And slots 12 and 15 are substantially as long as the stream of electrons is wide. Electrons of the same row or rank, entering slot 12 at the same instant of time, consequently encounter dissimilar conditions, assuming a signal wave to be travelling through buncher guide 9. Some of the electrons find a positive field; others find a negative field; still others find a field of zero potential. All of these electrons pass completely through the buncher slot 12, but the velocity of some is accelerated, the velocity of others is decelerated, and the velocity of still others is unchanged.

The above is descriptive of what happens to each row of electrons which enters buncher slot 12, that is, some of the constituent electrons are speeded up, others are slowed down, and still others are not changed in speed. Since each electron is a constituent of a very narrow beam or file as well as of a row, it will be seen that in the drift portion 28 of tube 5 there are a plurality of density-modulated electron beams side by side and that the modulations correspond to a plurality of wavelengths of the electromagnetic signal wave travelling at that instant through buncher wave guide 9. It will be further understood that any signal wave, in travelling through buncher wave guide 9 from right to left, velocity-modulates electrons of each narrow beam or file successively from right to left. In the drift portion 28 of the tube, the velocity-modulated beam is converted to a density-modulated beam, in a manner well understood in this art.

When the density-modulated electrons enter and pass through catcher slot 15, deceleration occurs and energy is given up to the catcher grids in known manner. This energy is effective to excite within catcher wave guide 10 electromagnetic fields having a configuration corresponding to, but of greater strength than, the electromagnetic signal wave which, in passing through buncher guide 9, modulated the electron stream. The signal wave within catcher guide 10 lags the wave of buncher guide 9 by a very small amount of time, which is measured by the electron transit time between buncher guide 9 and catcher guide 10.

The fields excited within catcher wave guide 10 travel in directions perpendicular to the direction of the electron flow. These fields consequently tend to travel within guide 10 both to the left and to the right as viewed in Figure 1. However, the fields which travel to the right are substantially cancelled by fields of equal magnitude but opposite polarity travelling in the same direction, as will be understood from the following explanation.

First contemplate fields excited in catcher wave guide 10 by a density-modulated beam of electrons having a file position as indicated by the dotted line F in Figure 1, the beam modulation having been effected by a signal wave travelling through buncher guide 9 from right to left. Next contemplate fields set up in catcher guide 10 by a density-modulated beam of electrons having a file position indicated in Figure 1 by the dotted line G, this position being located one-quarter wavelength to the left of position F. It is assumed of course that the electron beam of file position G has been modulated by the same signal wave that modulated the electron beam of position F. Observe that the distance from the signal source located at the right hand end of buncher guide 9 to the right hand portion of catcher guide 10 is one-half wavelength longer if file position G be used as a path than if file position F be employed. It will thus be seen that the fields excited by the beam of file position G which travel to the right in catcher guide 10 will be 180° out of phase with the fields travelling in the same direction excited by the electron beam of file position F.

The above consideration may be applied to an electron beam occupying any file position. In all cases, substantial cancellation of the fields travelling to the right in catcher guide 10 will result, assuming the parent wave to be travelling through buncher guide 9 from right to left.

Again assuming the same signal as a source, that is, again assuming the parent wave to be travelling from right to left in buncher guide 9, the fields excited in catcher guide 10 which travel to the left are strengthened by other fields of substantially equal magnitude and the same polarity excited in guide 10 by electron beams of other file positions. This may be demonstrated by again considering the electron beams occupying file positions F and G. It will be seen that the lengths of the various paths from the signal source at right hand portion of buncher guide 9 to the left hand portion of catcher guide 10 are equal irrespective of whether the signal uses the electron beam of file position F or G. Consequently the fields excited in wave guide 10 which travel to the left are additive.

Thus far we have considered only an electromagnetic wave travelling in buncher guide 9 from right to left. Let us now contemplate a second source which propagates a signal wave through guide 21 from left to right, as shown by the dotted arrow 31. This wave may be of the same or different frequency than that of the wave travelling in the opposite direction indicated by the solid arrow 30. The signal wave, whose direction is indicated by dotted arrow 31, may be applied to impedance matching section 17 and will pass through buncher wave guide 9 from left to right. In so doing, the wave will successively velocity-modulate electrons occupying each file position across the width of the electron stream. As is known, these velocity-modulated electrons become converted into density-modulated beams and in like manner to that described above, excite fields in catcher guide 10 which are identical in configuration to, but of greater strength than, the fields of the parent wave travelling to the right through buncher guide 9. Fields excited in catcher guide 10 tend to travel in both directions but those moving to the left are substantially cancelled by fields of substantially equal magnitude and opposite polarity set up by electron beams one-quarter wavelength distant across the sheetlike stream. Fields moving to the right in guide 10 are on the other hand strengthened by fields of substantially equal magnitude and the same polarity excited by the other electron beams. The foregoing will be readily comprehended from the discussion given previously hereinabove in connection with fields set up in guide 10 by a signal wave moving to the left through buncher guide 9.

It has been shown above that an incoming signal wave travelling to the left through guide 20 and applied to tube 5 at impedance matching section 16 appears in amplified form in impedance matching section 19 travelling to the left and may be delivered as output into guide 23. Substantially none of this wave appears in section 18 or guide 22.

It has also been shown that an incoming signal wave travelling to the right through guide 21 and applied to tube 5 at impedance matching section 17 appears in amplified form in impedance matching section 18 travelling to the right and may be delivered as output into guide 22. Substantially none of this wave appears in section 19 or in guide 23.

It will be understood that the directional or selective properties of the tube will be greater when the width of the electron stream, measured in terms of wavelengths, is greater.

Simultaneous amplification of signal waves incoming from both directions may occur, and in the preferred application does occur, without interference or intermixture of energy therebetween, assuming tube 5 to be adjusted to operate as a linear amplifier. The frequency of the signal wave incoming from one direction may be the same as, or may be different from, that of the wave incoming from the opposite direction.

The apparatus of the present invention may consequently be used to simultaneously amplify signals moving in both directions in a two-directional transmission system. Or the device may be employed for monitoring purposes, as by tapping into the main line wave guides.

A particular application of my novel velocity-modulated tube is illustrated in Figure 3 of the drawing. In that figure there is shown a representation of the same tube shown in more detail in Figure 1. In Figure 3, the right end of the catcher (output) guide is coupled to the buncher (input) guide on the same side of the tube. Such an arrangement is capable of amplifying the original input signal according to the square of the amplification of the tube, as will be readily understood from a consideration of the drawing. Assume a signal wave applied to the left end of the buncher guide as indicated by the arrow. This signal wave in amplified form is delivered at the right end of the catcher guide, travels through coupling 40 and is applied to the right end of the buncher guide, is again amplified by the tube and is delivered at the left end of the catcher guide to the outgoing transmission line.

Other applications will occur to those skilled in the art without departing from the scope of my inventions as defined in the claims.

Having described my invention, I claim:

1. Apparatus for amplifying two electromagnetic waves of the same or different high frequencies without interference therebetween, said apparatus comprising: a velocity-modulated vacuum tube having electrodes including cathode, buncher grids and catcher grids, each of said electrodes being longer than one wavelength at the lowest operating frequency, said electrodes being substantially parallel to each other and extending lengthwise in the direction of wave propagation; means for projecting electrons from said cathode through said buncher grids toward said catcher grids in a sheet-like stream, said electron stream being wider than one wavelength at said lowest operating frequency; input wave-guiding means connected to opposite ends of said buncher grids for applying independent waves to opposite ends of said buncher grids to propagate said waves along said buncher grids in opposite directions, unit portions of said waves acting successively upon different unit portions of said electron stream as the waves move thereacross; and output wave-guiding means connected to opposite ends of said catcher grids for delivering independent output waves in opposite directions, unit portions of said output waves deriving energy successively and cumulatively from different unit portions of said electron stream.

2. Apparatus for amplifying simultaneously two electromagnetic waves of the same or different high frequencies without interference therebetween, said apparatus comprising: a single velocity-modulated vacuum tube having at least cathode, buncher-grid and catcher-grid electrodes, said electrodes being positioned substantially parallel to each other and extending in the direction of wave propagation, each of said electrodes having a length of at least several wavelengths at the lowest operating frequency; means for projecting electrons from said cathode through said buncher-grid electrodes toward said catcher-grid electrodes in a sheet-like stream, said electron stream being at least several wavelengths wide at said lowest operating frequency; input wave-guiding means connected to opposite ends of said buncher-grid electrodes for applying simultaneously independent waves to opposite ends of said buncher grids to propagate said waves along said buncher grids in opposite directions, said directions being transverse to the direction of said electron stream, thus to modulate the rate of movement of said electrons toward said catcher grids; and output wave-guiding means connected to opposite ends of said catcher grids for delivering simultaneously independent output waves in opposite directions, said output waves being amplified copies of said input waves, the energy in said output waves being derived from said electron stream.

DAVID E. SUNSTEIN.

REFERENCES CITED

The following references are of record in the file of this patent:

UNITED STATES PATENTS

| Number | Name | Date |
|---|---|---|
| 2,122,538 | Potter | July 5, 1938 |
| 2,289,846 | Litton | July 14, 1942 |
| 2,368,031 | Llewellyn | Jan. 23, 1945 |
| 2,375,223 | Hansen et al. | May 8, 1945 |
| 2,420,342 | Samuel | May 13, 1947 |
| 2,423,390 | Korman | July 1, 1947 |